W. TAYLOR.
BELT FASTENER.
APPLICATION FILED OCT. 17, 1919.

1,435,347.

Patented Nov. 14, 1922.

INVENTOR.
William Taylor
BY
ATTORNEY.

Patented Nov. 14, 1922.

1,435,347

UNITED STATES PATENT OFFICE.

WILLIAM TAYLOR, OF LEICESTER, ENGLAND.

BELT FASTENER.

Application filed October 17, 1919. Serial No. 331,454.

*To all whom it may concern:*

Be it known that I, WILLIAM TAYLOR, a subject of the King of Great Britain, and a resident of Stoughton Street Works, Leicester, England, have invented certain new and useful Improvements in Belt Fasteners, of which the following is a specification.

This invention relates to improvements in fasteners for round belts such as are made, for example, of gut and leather, and has for its object to provide an improved means of detachably fastening together the ends of such belts.

It is usual, for this purpose, to attach to each end of the belt, generally by screwing thereon, a coupling member, one of which coupling members is provided with a hook, while the other is provided with an eye in which the hook can be engaged.

The hook and eye together form a kind of universal joint, permitting limited bending and preventing relative rotation, but the device is mechanically weak and specially liable to become worn or broken.

According to the present invention one of the coupling members (hereafter called the ball member) is provided with a ball-shaped head united therewith co-axially by a neck, while the other coupling member (hereafter called the socket member) is provided with a socket adapted to engage behind the head, the socket having a co-axially disposed hole to accommodate the neck and a lateral opening through which, when engaging the members, the head may be passed into the socket, and the neck into the central hole.

The coupling members are preferably screwed one to each end of the belt, as heretofore.

Figure 1:
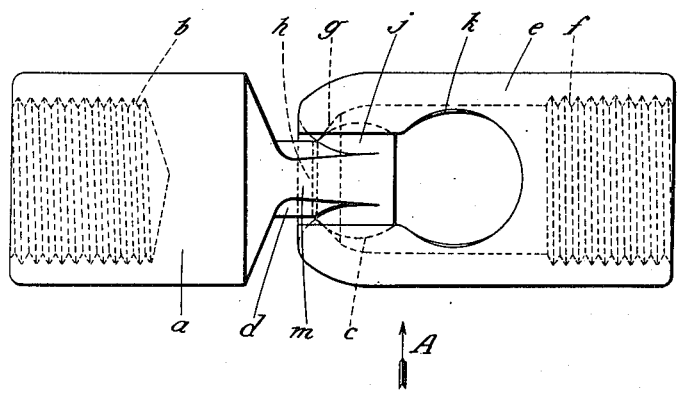
Figure 2:
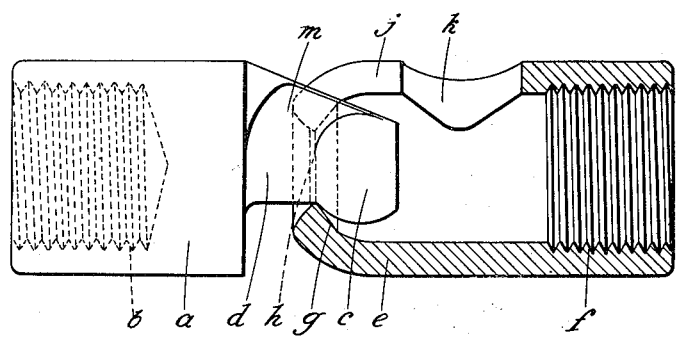

The invention is illustrative by the accompanying drawings wherein Figure 1 is an elevation of one form of belt fastener and Figure 2 is a view in the direction of the arrow A. Figure 1, showing the ball member in elevation and the socket member in central longitudinal section.

As shewn the ball member $a$ which is formed with the usual threaded recess $b$ for attachment to a round belt (not shewn) has a ball-shaped head $c$ united thereto co-axially by a neck $d$, whilst the socket member $e$ formed with a similar threaded recess $f$, has a socket $g$ adapted to engage behind the head $c$, the socket $g$ having a co-axially disposed hole $h$ to accommodate the neck $d$ of the ball member $a$ and permit of its sufficiently free motion therein. Further the socket member $e$ is formed with a lateral opening $j$, $k$ through the part $k$ of which the head $c$ may be passed into the socket $g$ and through the part $j$ of which the neck $d$ may be passed into the hole $h$ when the members are interengaged.

The lateral opening $j$, $k$ in the socket member $e$ is preferably shaped as shewn, and its larger part $k$ is so far from the end of the member, while the neck $d$ is made of such length, that when the two members $a$, $e$ are brought, after engagement, into working relation (that is substantially co-axial as shewn) the head $d$ cannot escape laterally from the opening $k$.

In order that relative rotation of the members may be prevented a radial rib-like addition $m$ to the neck $d$ may be provided and adapted to engage in the part $j$ of the lateral opening of the socket member $e$ the said rib $m$ being narrower than the part $j$ of the opening to permit sufficient freedom of said rib therein.

I claim:—

A belt fastener, comprising cooperating ball and socket coupling members, the ball member being provided with a neck having a radial rib, and the socket member having a lateral opening comprising an enlarged portion for the passage of the ball and a slot adapted to permit the passage of the neck and to engage the said rib loosely so as to permit a limited angular movement between the coupling members while preventing relative rotation thereof.

WILLIAM TAYLOR.